US012607066B2

(12) United States Patent
Li

(10) Patent No.: US 12,607,066 B2
(45) Date of Patent: Apr. 21, 2026

(54) STEPLESS LEVELER MOUNTED ON SIDE OF LADDER LEG

(71) Applicant: Yanneng Li, Zhangzhou (CN)

(72) Inventor: Yanneng Li, Zhangzhou (CN)

(73) Assignee: Yanneng Li, Zhangzhou (CN)

( * ) Notice: Subject to any disclaimer, the term of this patent is extended or adjusted under 35 U.S.C. 154(b) by 0 days.

(21) Appl. No.: 19/303,408

(22) Filed: Aug. 19, 2025

(65) Prior Publication Data

US 2026/0071493 A1 Mar. 12, 2026

(30) Foreign Application Priority Data

Sep. 6, 2024 (CN) ......................... 202422192417.4

(51) Int. Cl.
*E06C 7/44* (2006.01)

(52) U.S. Cl.
CPC ...................................... *E06C 7/44* (2013.01)

(58) Field of Classification Search
CPC ............... E06C 7/44; E06C 7/46; E06C 7/426
See application file for complete search history.

(56) References Cited

U.S. PATENT DOCUMENTS 2,318,017 A * 5/1943 Schmidt .................... E06C 7/46 182/201
2,914,135 A * 11/1959 Crouch ..................... E06C 7/44 182/201
D230,370 S * 2/1974 Kaye .............................. D25/68
4,209,078 A * 6/1980 Gerber ....................... E06C 7/44 182/203
4,607,726 A * 8/1986 Davis ......................... E06C 7/44 248/188.8
4,744,441 A * 5/1988 Sandstrom ................ E06C 7/46 182/201
4,766,976 A * 8/1988 Wallick, Jr. ............... E06C 7/44 182/201
4,792,017 A * 12/1988 Grove ........................ E06C 7/44 248/188.4
4,836,331 A * 6/1989 Foradori ................... E06C 7/46 182/201

(Continued)

FOREIGN PATENT DOCUMENTS

FR 2842562 A1 * 1/2004 ............... E06C 7/44
GB 2124691 A * 2/1984 ............... E06C 7/44

(Continued)

*Primary Examiner* — Colleen M Chavchavadze

(57) ABSTRACT

A stepless leveler mounted on a side of a ladder leg is provided, including an adjuster for a ladder, where the adjuster(s) are symmetrically or is individually fixed to a bottom of the ladder. The adjuster includes a fixing part, a stepless adjustment part, and an adjustable support part, the fixing part is fixedly connected to the ladder, the stepless adjustment part is arranged at a position opposite to the fixing part, and the support part is connected to the stepless adjustment part. In the present invention, the adjuster is mounted on the ladder through the fixing part, and the ladder is allowed to be placed flush on stairs or uneven ground through the stepless adjustment part and the support part, thereby ensuring the stability of the ladder during use and improving the safety factor of operating personnels.

5 Claims, 7 Drawing Sheets

(56) References Cited

U.S. PATENT DOCUMENTS

| | | | | |
|---|---|---|---|---|
| 4,844,208 A * | 7/1989 | Veness | E06C 7/44 182/201 |
| 5,325,936 A * | 7/1994 | Baker | E06C 7/44 182/204 |
| 6,935,463 B2 * | 8/2005 | Brewster | E06C 7/46 248/188.4 |
| 2014/0054111 A1 * | 2/2014 | Lu | E06C 7/44 182/107 |
| 2025/0034942 A1 * | 1/2025 | Yingling | E06C 7/46 |

FOREIGN PATENT DOCUMENTS

| | | | | |
|---|---|---|---|---|
| KR | 940002749 Y1 * | 4/1994 | E06C 7/44 |
| KR | 20120133720 A * | 12/2012 | E06C 7/46 |
| WO | WO-2011055863 A1 * | 5/2011 | E06C 7/44 |

* cited by examiner

STEPLESS LEVELER MOUNTED ON SIDE OF LADDER LEG

CROSS REFERENCE TO THE RELATED APPLICATIONS

This application is based upon and claims priority to Chinese Patent Application No. 2024221924174, filed on Sep. 6, 2024, the entire contents of which are incorporated herein by reference.

TECHNICAL FIELD

The present invention mainly relates to the technical field of ladder leg supports, in particular to a stepless leveler mounted on a side of a ladder leg.

BACKGROUND

At present, two ends of a ladder are flush. During use, it can be well supported when contacting the flat ground, but may be limited in use or may not work when laying on stairs or uneven places. The existing patent application, with the number of 2021227154386, discloses a ladder adjustable support leg. To address the problems in the prior art that a step ladder is generally moved by a retractable device, the retractable device needs to be completely extended or retracted for fixing, and it cannot be adjusted to any length according to needs, the following solution is proposed, which includes a retractable rod and a step ladder, a fitting frame is slidably sleeved on the outer wall of the retractable rod, four connecting holes are symmetrically provided at the four corners of the right inner wall of the fitting frame, the connecting holes of the fitting frame are fixedly connected to the inside of the step ladder by bolts, a locking plate is movably sleeved on the outer wall of the retractable rod, the number of the locking plate is three, the right side of the locking plate is rotatably connected to the inside of the step ladder, and the locking pattern of the locking plate is controlled to be engaged or disengaged with the locking pattern of the retractable rod, so as to facilitate the control of the step ladder to achieve the effect of arbitrary height adjustment.

With respect to the related technologies above, the inventor believes that although the support portion of the existing support leg can be adaptively used for height adjustment, its fixed angle cannot be adjusted, leading to a relatively poor fixing effect.

SUMMARY

To address the problems in the background above, the present invention provides a stepless leveler mounted on a side of a ladder leg.

The present invention adopts the following technical solution: A stepless leveler mounted on a side of a ladder leg, including an adjuster for a ladder, where the adjuster(s) are symmetrically or is individually fixed to a bottom of the ladder. The adjuster includes a fixing part, a stepless adjustment part, and an adjustable support part. The fixing part is fixedly connected to the ladder, the stepless adjustment part is arranged at a position opposite to the fixing part, and the support part is connected to the stepless adjustment part.

Preferably, the fixing part includes a fixing frame, a base plate, and at least one fixing bolt. The fixing frame is arranged on an outer side of the ladder, and the base plate is arranged on an inner side of the ladder. The fixing frame and the base plate are connected by the bolt for fixed connection to the ladder.

Preferably, the stepless adjustment part includes a mounting base, an adjustment rod, a spring, and a plurality of locking plates. The mounting base is fixed to an outer side of the fixing frame, and the adjustment rod vertically penetrates through the mounting base. The plurality of locking plates are arranged around the adjustment rod and contact an outer wall of the adjustment rod. The spring is wrapped around an outer side of the adjustment rod to push the locking plates. The mounting base is provided with an opening corresponding to the locking plates.

Preferably, the mounting base is provided with a limiting plate, and the limiting plate limits one end of each of the plurality of locking plates.

Preferably, the adjustment rod is provided with a limiting cap sleeved on its upper end, and the radius of the limiting cap is larger than the radius of the adjustment rod.

Preferably, the fixing frame is provided with an engaging groove, and the mounting base is provided with an L-shaped engaging plate. The engaging plate is slidably inserted into the engaging groove. The fixing frame is symmetrically provided with through holes, and a latch is connected to the through holes. The latch passes through the symmetrical through holes and contacts a bottom wall of the engaging plate.

Preferably, the latch is connected with a U-shaped limiting member. One end of the U-shaped limiting member is rotatably connected to one end of the latch, and the other end is engaged with the other end of the latch.

Preferably, the support part includes a connecting column, a rotating head, and a fixing base. The connecting column is detachably connected to the adjustment rod, the rotating head is arranged at a lower end of the connecting column, and the rotating head is movably connected to a groove of the fixing base.

Preferably, the connecting column is provided with an internal thread, a lower end of the adjustment rod is provided with an external thread that fits the internal thread, and the connecting column is threadedly connected to the adjustment rod.

Preferably, the rotating head is spherical, and the groove of the fixing base fits the rotating head to limit the spherical rotating head.

Preferably, the fixing base is made of rubber, and a bottom of the fixing base is provided with an annular anti-slip pattern.

Compared with prior art, the present invention has the following technical effects:

1. In the present invention, the adjuster is mounted on the ladder through the fixing part, and the ladder is allowed to be placed flush on stairs or uneven ground through the stepless adjustment part and the support part, thereby ensuring the stability of the ladder during use and improving the safety factor of operating personnels.
2. In the present invention, through the cooperation of the fixing frame, the base plate, and the fixing bolt, a symmetrical fixation to the ladder is achieved, leading to a good fixing effect.
3. The present invention can realize a stepless adjustment of the height of the adjustment rod to adapt to usage scenarios by the cooperation of the mounting base, the adjustment rod, the spring, the plurality of locking plates, and the limiting plate. When the plurality of locking plates are pushed downward through the opening, the limiting plate limits the locking plates to a horizontal state for easy adjustment; when the locking plates are released, the spring pushes the locking plates to move along the limiting plate to an inclined state, and the locking plates contact the outer wall of the adjustment rod for fixing the adjustment rod to prevent the adjustment rod from moving.

4. In the present invention, through the cooperation of the connecting column, the spherical rotating head, and the fixing base with groove, the position of the fixing base on the rotating head can be adjusted according to the angle at which the ladder is placed, so that the bottom of the fixing base contacts the ground, with unchanged contact area, improving the stability of use.

The present invention will be explained in detail below with reference to the accompanying drawings and specific embodiments.

Figure 1:
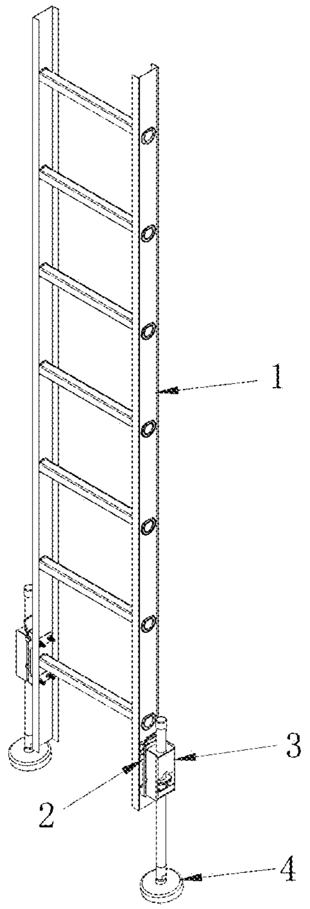
FIG. 1 is a schematic diagram of the overall structure after installation according to the present invention.

In the figures: 1. ladder; 2. fixing part; 21. fixing frame; 211. engaging groove; 22. base plate; 23. fixing bolt; 24. latch; 25. U-shaped limiting member; 3. stepless adjustment part; 31. mounting base; 311. opening; 312. engaging plate; 32. adjustment rod; 33. limiting plate; 34. locking plate; 35. spring; 36. limiting cap; 4. support part; 41. connecting column; 42. rotating head; 43. fixing base.

DETAILED DESCRIPTION OF THE EMBODIMENTS

To facilitate the understanding of the present invention, the present invention will be described more comprehensively below with reference to the relevant drawings. Several embodiments of the present invention are given in the drawings, but the present invention can be implemented in different forms and is not limited to the embodiments described herein. On the contrary, these embodiments are provided to make the content disclosed in the present invention more thorough and comprehensive.

It should be noted that when an element is described as being "fixed on" another element, it may be directly on the another element or there may be an intermediate element. When an element is described as being "connected to" another element, it may be directly connected to the another element or there may be an intermediate element at the same time. The terms "vertical", "horizontal", "left", "right", and similar expressions used herein are for illustrative purposes only.

Unless otherwise defined, all technical and scientific terms used herein have the same meaning as commonly understood by those skilled in the art to which the present invention pertains. The terms used herein in the specification of the present invention are for the purpose of describing specific embodiments only and are not intended to limit the present invention. The term "and/or" used herein includes one or any and all combinations of two or more of the related listed items.

Figure 2:
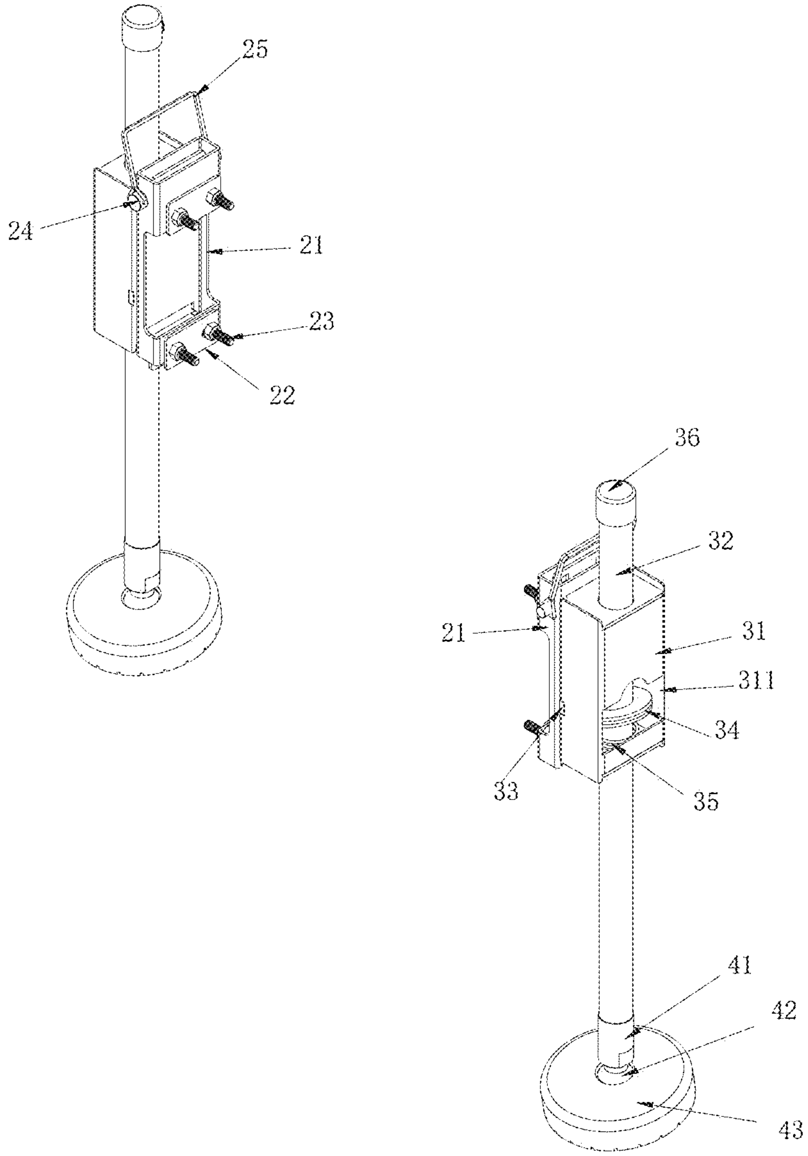
FIG. 2 is a schematic diagram showing the structure of the adjuster according to the present invention.
Figure 3:
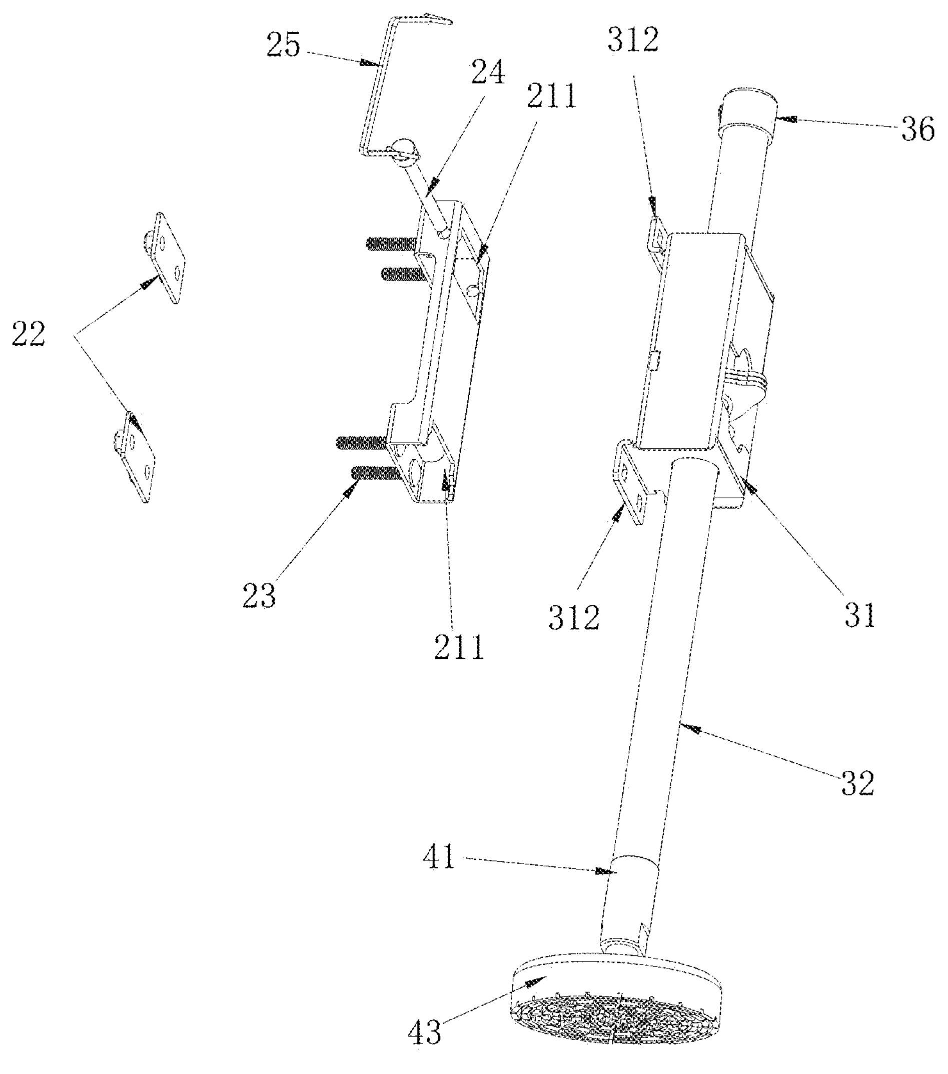
FIG. 3 is an exploded view showing the structure of the adjuster according to the present invention.
Figure 4:
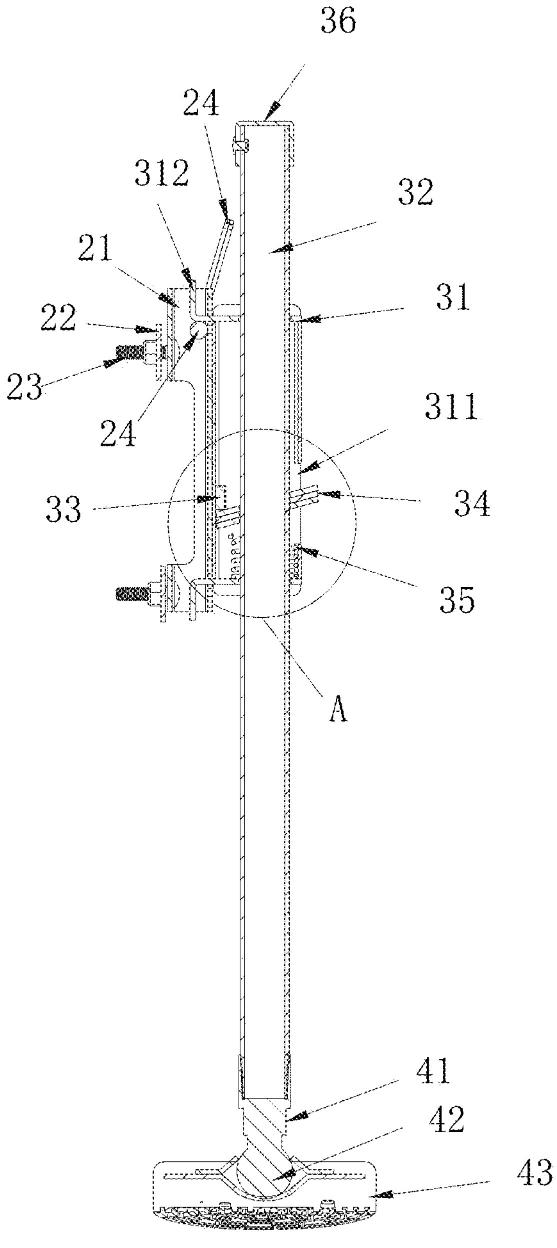
FIG. 4 is a cross-sectional view showing the structure of the adjuster according to the present invention.
Figure 5:
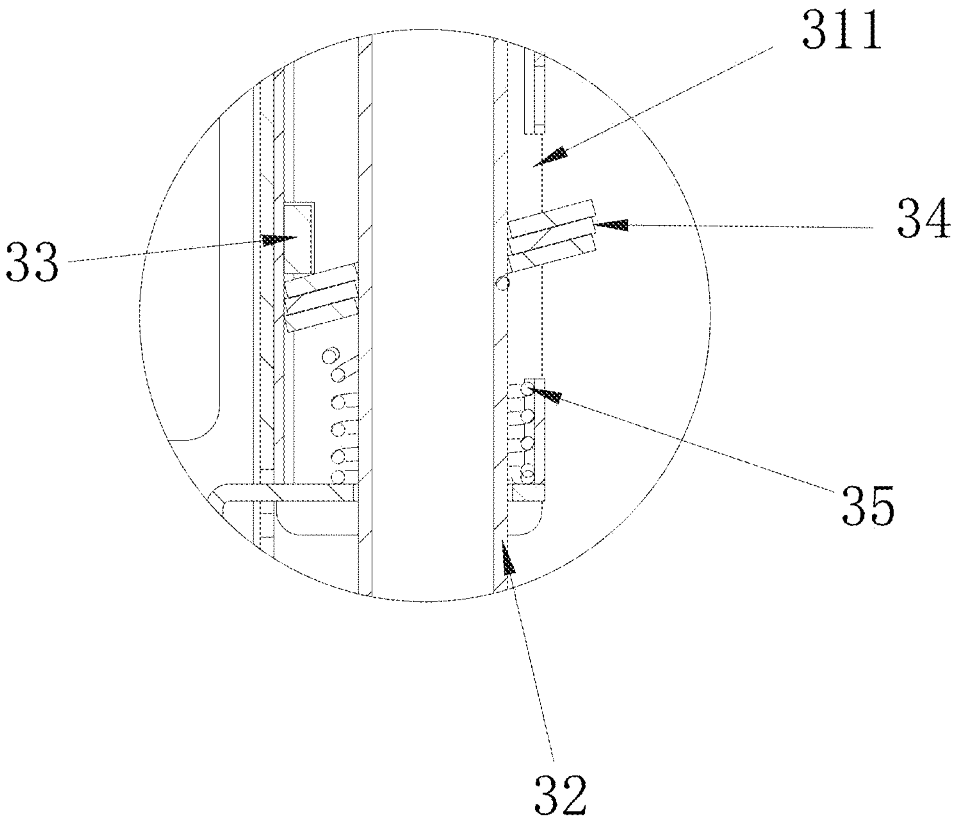
FIG. 5 is an enlarged view showing the structure of the portion A in FIG. 4.
Figure 6:
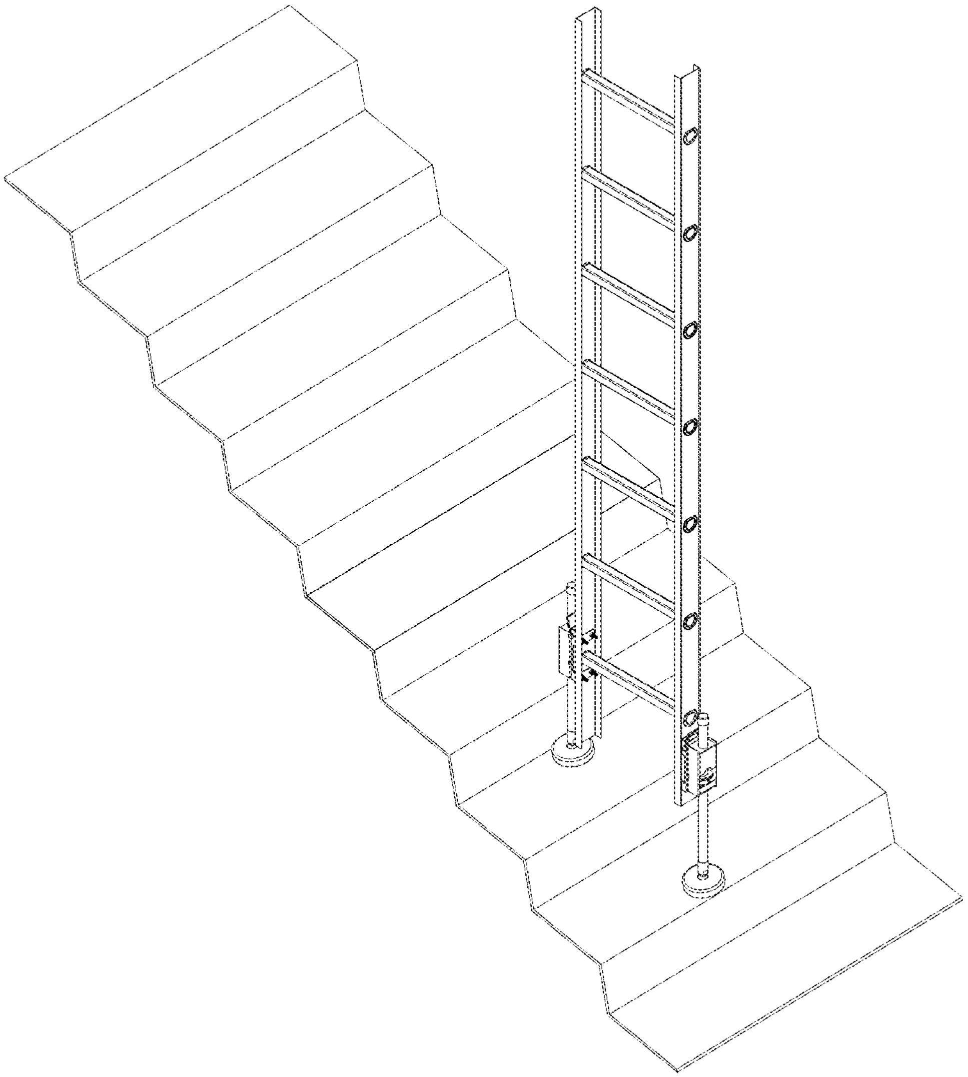
FIG. 6 is a first diagram showing the use effect of the present invention.
Figure 7:
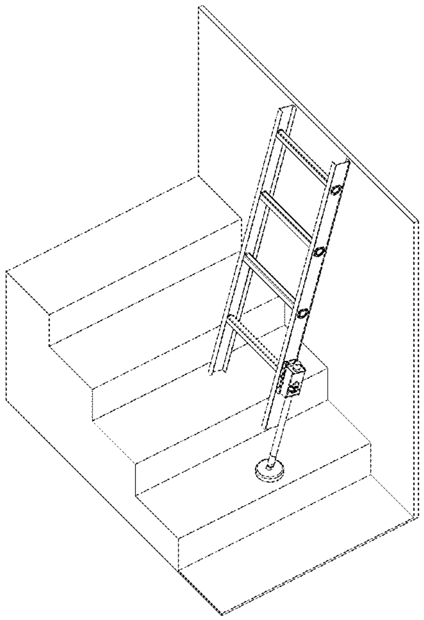
FIG. 7 is a second diagram showing the use effect of the present invention.

Referring specifically to FIG. 1 to FIG. 7, a stepless leveler mounted on a side of a ladder leg is provided, including an adjuster for a ladder 1. The adjuster(s) are symmetrically or is individually fixed to the bottom of the ladder 1. The adjuster includes a fixing part 2, a stepless adjustment part 3, and an adjustable support part 4. The fixing part 2 is fixedly connected to the ladder 1, the stepless adjustment part 3 is arranged at a position opposite to the fixing part 2, and the support part 4 is connected to the stepless adjustment part 3. The adjuster is mounted on the ladder 1 through the fixing part 2, and the ladder 1 is allowed to be placed flush on stairs or uneven ground through the stepless adjustment part 3 and the support part 4, thereby ensuring the stability of the ladder 1 during use and improving the safety factor of operating personnels.

In the present invention, the fixing part 2 includes a fixing frame 21, a base plate 22, and at least one fixing bolt 23. The fixing frame 21 is arranged on the outer side of the ladder 1, and the base plate 22 is arranged on the inner side of the ladder 1. The fixing frame 21 and the base plate 22 are connected by the bolt for fixed connection to the ladder 1. The adjuster is installed on the ladder 1 through the fixing part 2, and the ladder 1 is allowed to be placed flush on stairs or uneven ground through the stepless adjustment part 3 and the support part 4, thereby ensuring the stability of the ladder 1 during use and improving the safety factor of operating personnels.

In the present invention, the stepless adjustment part 3 includes a mounting base 31, an adjustment rod 32, a spring 35, and a plurality of locking plates 34. The mounting base 31 is fixed to the outer side of the fixing frame 21, and the adjustment rod 32 vertically penetrates through the mounting base 31. The plurality of locking plates 34 are arranged around the adjustment rod 32 and contact the outer wall of the adjustment rod 32. The spring 35 is wrapped around the outer side of the adjustment rod 32 to push the locking plates 34. The mounting base 31 is provided with a limiting plate 33, and the limiting plate 33 limits one end of each of the plurality of locking plates 34. The adjustment rod 32 is provided with a limiting cap 36 sleeved on its upper end, and the radius of the limiting cap 36 is larger than the radius of the adjustment rod 32. The mounting base 31 is provided with an opening 311 corresponding to the locking plates 34. The present invention can realize a stepless adjustment of the height of the adjustment rod 32 to adapt to usage scenarios by the cooperation of the mounting base 31, the adjustment rod 32, the spring 35, the plurality of locking plates 34, and the limiting plate 33. When the plurality of locking plates 34 are pushed downward through the opening 311, the limiting plate 33 limits the locking plates 34 to a horizontal state for easy adjustment; when the locking plates 34 are released, the spring 35 pushes the locking plates 34 to move along the limiting plate 33 to an inclined state, and the locking plates 34 contact the outer wall of the adjustment rod 32 for fixing the adjustment rod 32 to prevent the adjustment rod 32 from moving.

In the present invention, the fixing frame 21 is provided with an engaging groove 211. The mounting base 31 is provided with an L-shaped engaging plate 312. The engaging plate 312 is slidably inserted into the engaging groove 211. The fixing frame 21 is symmetrically provided with through holes, and a latch 24 is connected to the through holes. The latch 24 passes through the symmetrical through holes and contacts the bottom wall of the engaging plate 312. The latch 24 is connected with a U-shaped limiting member 25. One end of the U-shaped limiting member 25 is rotatably connected to one end of the latch 24, and the other end is engaged with the other end of the latch 24. After the fixing frame 21 is installed, the mounting base 31 can slide from the bottom of the fixing frame 21 to the top, so that the engaging plate 312 is slidably inserted into the engaging groove 211. After arriving in place, the latch 24 is inserted, and the latch 24 passes through the two through holes and contacts the bottom of the engaging plate 312. The U-shaped limiting member 25 is rotated to engage with the other end of the latch 24 to limit the latch 24, facilitating rapid and convenient fixation and installation. When the ladder 1 is stored or used in an environment that does not require a leveler, only the engaged U-shaped limiting member 25 needs to be removed, followed by pulling out the latch 24, such that the mounting base 31 can slide downward to be quickly and conveniently removed. The fixing frame 21 can be permanently installed on the ladder 1 due to its installation requires little space. With this fixing frame 21, the mounting base 31 and the support part 4 can be easily and quickly installed, which provides convenience.

In the present invention, the support part 4 includes a connecting column 41, a rotating head 42, and a fixing base 43. The connecting column 41 is detachably connected to the adjustment rod 32, the rotating head 42 is arranged at the lower end of the connecting column 41, and the rotating head 42 is movably connected to the groove of the fixing base 43. The connecting column 41 is provided with an internal thread, the lower end of the adjustment rod 32 is provided with an external thread that fits the internal thread, and the connecting column 41 is threadedly connected to the adjustment rod 32. The rotating head 42 is spherical, and the groove of the fixing base 43 fits the rotating head 42 to limit the spherical rotating head 42. The fixing base 43 is made of rubber, and the bottom of the fixing base 43 is provided with an annular anti-slip pattern. Through the cooperation of the connecting column 41, the spherical rotating head 42, and the fixing base 43 with groove, the position of the fixing base 43 on the rotating head 42 can be adjusted according to the angle at which the ladder 1 is placed, so that the bottom of the fixing base 43 contacts the ground, with unchanged contact area, improving the stability of use.

The principle of implementation of the stepless leveler mounted on a side of a ladder leg according to the present invention is as follows:

The base plate 22 is placed on the inner side of the ladder 1, followed by corresponding the mounting base 31 with the base plate 22, inserting the fixing bolt 23 to connect the fixing frame 21, the ladder 1, and the base plate 22, and then tightening a nut. When the ladder 1 is used in an environment that does not require an adjustment, only the fixing frame 21 is installed.

When the ladder 1 is used in an environment that needs to be leveled, the mounting base 31 is slidably mounted on the fixing frame 21, the engaging plate 312 slides into the engaging groove 211, then the latch 24 is inserted and passes through the bottom of the engaging plate 312, the latch 24 fixes the engaging plate 312 into the engaging groove 211, and then the U-shaped limiting member 25 is rotated to engage with the latch 24 to prevent the latch 24 from loosening during use.

When in use, the ladder 1 is first placed at the location to be used, and the fixing base 43 is allowed to contact the ground and be flush with the ground through the rotation of the spherical rotating head 42. The adjustment process is quick and convenient. The freely rotatable rotating head 42 ensures that the ladder 1 can be used at different angles and environments with uneven lower support surfaces. Furthermore, an annular anti-slip pattern is provided on the bottom of the fixing base 43.

Then, a finger can pass through the opening 311 to move the plurality of locking plates 34 downward and push the spring 35 to compress. When the locking plates 34 are placed in a horizontal state, the adjustment rod 32 is moved up and down to an appropriate position. The adjustment rod 32 drives the fixing base 43 to move. After arriving in place, the plurality of locking plates 34 are released, and the spring 35 is reset to push the lock plates 34 to contact the limiting plate 33 and tilt along the limiting plate 33, so that the inner sides of the plurality of locking plates 34 contact the outer side of the adjustment rod 32, thereby locking and fixing the adjustment rod 32. The ladder 1 is adjusted according to the scene and the ground to ensure the stability of the ladder 1 and improve the safety factor.

The above is an exemplary description of the present invention in combination with the accompanying drawings. It is obvious that the specific implementation of the present invention is not limited to the above. As long as a non-substantial improvement is made by adopting the methodological concept and technical solution of the present invention, or the concept and technical solution of the present invention is directly applied to other occasions without improvement, they are all within the scope of protection of the present invention.

What is claimed is:

1. A stepless leveler mounted on a side of a ladder leg of a ladder (1), comprising one or more adjusters for the ladder (1), wherein the one or more adjuster(s) are symmetrically or is individually fixed to a bottom of the ladder (1), each of the one or more adjusters comprises a fixing part (2), a stepless adjustment part (3), and an adjustable support part (4), the fixing part (2) is fixedly connected to the ladder (1), the stepless adjustment part (3) is detachably connected to the fixing part (2), and the support part (4) is connected to the stepless adjustment part (3);

wherein the fixing part (2) comprises a fixing frame (21), a base plate (22), and at least one fixing bolt (23), the fixing frame (21) is arranged on an outer side of the ladder (1), the base plate (22) is arranged on an inner side of the ladder (1), the fixing frame (21) and the base plate (22) are connected by the bolt for fixed connection to the ladder (1);

wherein the stepless adjustment part (3) comprises a mounting base (31), an adjustment rod (32), a spring (35), and a plurality of locking plates (34), the mounting base (31) is fixed to an outer side of the fixing frame (21), the adjustment rod (32) vertically penetrates through the mounting base (31), the plurality of locking plates (34) are arranged around the adjustment rod (32) and contact an outer wall of the adjustment rod (32), the spring (35) is wrapped around an outer side of the adjustment rod (32) to push the locking plates (34), and the mounting base (31) is provided with an opening (311) corresponding to the locking plates (34);

wherein the mounting base (31) is provided with a limiting plate (33), and the limiting plate (33) limits one end of each of the plurality of locking plates (34);

wherein the adjustment rod (32) is provided with a limiting cap (36) sleeved on an upper end of the adjustment rod, and a radius of the limiting cap (36) is larger than a radius of the adjustment rod (32);

wherein the fixing frame (21) is provided with an engaging groove (211), the mounting base (31) is provided with an L-shaped engaging plate (312), the engaging plate (312) is slidably inserted into the engaging groove (211), the fixing frame (21) is symmetrically provided with through holes, a latch (24) is connected to the through holes, and the latch (24) passes through the symmetrical through holes and contacts a bottom wall of the engaging plate (312).

2. The stepless leveler mounted on the side of the ladder leg of the ladder (1) according to claim 1, wherein the latch (24) is connected with a U-shaped limiting member (25), one end of the U-shaped limiting member (25) is rotatably connected to one end of the latch (24), and the other end is engaged with the other end of the latch (24).

3. The stepless leveler mounted on the side of the ladder leg of the ladder (1) according to claim 2, wherein the support part (4) comprises a connecting column (41), a rotating head (42), and a fixing base (43), the connecting column (41) is detachably connected to the adjustment rod (32), the rotating head (42) is arranged at a lower end of the connecting column (41), and the rotating head (42) is movably connected to a groove of the fixing base (43).

4. The stepless leveler mounted on the side of the ladder leg of the ladder (1) according to claim 3, wherein the connecting column (41) is provided with an internal thread, a lower end of the adjustment rod (32) is provided with an external thread that fits the internal thread, and the connecting column (41) is threadedly connected to the adjustment rod (32).

5. The stepless leveler mounted on the side of the ladder leg of the ladder (1) according to claim 4, wherein the rotating head (42) is spherical, the groove of the fixing base (43) fits the rotating head to limit the spherical rotating head (42), the fixing base (43) is made of rubber, and a bottom of the fixing base (43) is provided with an annular anti-slip pattern.

* * * * *